May 10, 1955 E. SILVERMAN 2,708,238

TELEVISION WAVE TRAP AND LIKE

Filed April 9, 1954 2 Sheets-Sheet 1

INVENTOR
EMANUEL SILVERMAN
BY
Sidney A. Ochs
ATTORNEY

May 10, 1955 E. SILVERMAN 2,708,238

TELEVISION WAVE TRAP AND LIKE

Filed April 9, 1954 2 Sheets-Sheet 2

INVENTOR
EMANUEL SILVERMAN
BY Sidney A. Ochs
ATTORNEY

United States Patent Office 2,708,238

Patented May 10, 1955

2,708,238

TELEVISION WAVE TRAP AND THE LIKE

Emanuel Silverman, Oak Park, Mich.

Application April 9, 1954, Serial No. 422,043

11 Claims. (Cl. 250—20)

This invention relates to means for eliminating interference in television receivers, for example, to eliminate FM, co-channel or adjacent channel interference. It is especially concerned with an efficient wave trap for eliminating the most extreme types of adjacent channel interference.

In many television areas considerable difficulty is being presently encountered with adjacent channel interference which makes its appearance as a slight herring-bone effect on the television receiver screen. In extreme cases as where the interfering channel is close by while the channel which it is desired to receive is at a distance, interference from the adjacent channel usually results in complet obliteration of both picture and sound of the channel which it is desired to receive. Similar obliteration results where the sound and/or picture of a lower channel interferes with an adjacent higher channel. The latter has occured for example, where the lower channel has picture and sound frequencies of 76 mc. and 80½ mc. respectively and the higher channel has picture and sound frequencies of 82 mc. and 86½ mc. respectively.

Although various devices have been suggested and tried to eliminate the interference in existing receivers none, insofar as I am aware, have, prior to my invention, successfully coped with the difficulty. To attempt rebuilding the receiver to provide suitable circuiting to meet the problem would, even if possible, be prohibitive.

My invention makes possible a solution of the problem without need of disturbing the internal mechanism of the receiver and with a minimum of effort on the part of the service technician and low cost to the set owner.

Accordingly, it is an object of my invention to provide means for eliminating FM, co-channel, and adjacent channel interference in television receivers.

Another object is to provide means for eliminating adjacent channel interference of the type wherein the sound and/or picture waves of a lower channel interfere with and substantially obliterate the picture and/or sound of an adjacent higher channel.

A further object is to provide a wave trap which will remove interference of the foregoing character from any television receiver without the necessity of getting inside the receiver unit itself.

Still another object is to provide a variable wave trap adjustable to facilitate the procurement of satisfactory reception from a given channel while providing means to attenuate interference from an adjacent channel and such that the reception on both channels is without interference.

A specific object is to provide a wave trap including a variable loop inductance adjustable to resonate over a band of frequencies and operable for eliminating interference between adjacent channels within said band.

A particular object is to provide a suitable housing for the adjustable loop inductance of the preceding object which housing will have a high di-electric value i. e. low loss so as not to adversely affect the high-Q of the wave trap.

Another object is to provide means for eliminating or attenuating extreme interference between adjacent channels of a television receiver by means of one or more wave traps having connctions in parallel with the antenna transmission line of a television receiver and preferably in juxtaposition to the receiver itself.

These and other objects of my invention will appear from the following description and from the drawings illustrating preferred and related embodiments of my invention.

In the drawings illustrating my invention:

Figure 1:
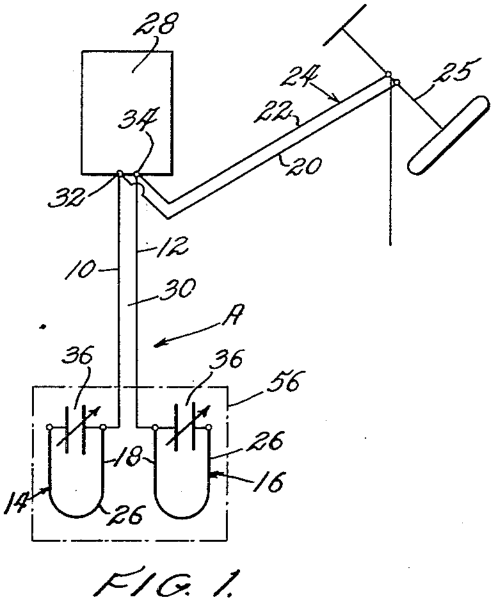
Figure 1 is a schematic view of one circuiting arrangement of my invention utilizing as part of the wave trap a single loop inductance type structure provided with a condenser control.

Broadly speaking my invention comprises an externally mountable wave trap generally designated by the letter A which includes conductors 10, 12 connecting it in parallel with the antenna transmission line of a television receiver and preferably at the antenna terminals of the television set. My wave trap preferably includes a pair of adjacent, that is to say, magnetic field coupled, high-Q tuned circuits generally referred to by the numerals 14 and 16 each connected at one side 18 only by the independent conductors 10, 12 to independent conductors 20, 22 respectively of the antenna transmission line generally designated by the numeral 24 which line interconnects the antenna 25 and the television receiver 28. The conductors 10, 12 together, may constitute a tuned lead circuit of predetermined electrical wave length.

In general each high-Q circuit 14, 16 may comprise an inductance, specifically a single loop inductance 26 and the connectors between the loops and the antenna transmission line illustrated as conductors 10, 12 may comprise independent conductors of a section 30 of conventional antenna transmission lead wire which may as described above constitute a tuned circuit having a length, electrically speaking, which is approximately ¼ of a wave length of the interfering adjacent channel. However in many cases depending upon the character of the interference it will be found preferable to make this length less than ¼ wave length (i. e. a capacitance) and even quite short. In other cases the length may be greater than ¼ wave length (i. e. a lead inductance). The inductance value of each loop in the circuiting should be such as to substantially result in a high-Q resonant circuit.

A further important feature of my invention is the mode of connecting the parts of the wave trap and making connection thereof with the television receiver installation. Thus I have discovered that in order to obtain satisfactory results one side 18 of one loop inductance 14 must be connected to the end of one conductor 10 of the tuned transmission lead section 30 and one side 18 of the other loop inductance 16 must be connected to the same end of a second conductor 12 of the section 30 and the opposite ends of these conductors 10, 12 must be connected to the antenna transmission lead 24 by connecting one conductor number 10 to one conductor 20 of the transmission lead 24 and connecting the second conductor 12 to a second conductor 22 of said lead 24. By preference the latter connections will be made at the terminals 32, 34 provided on the receiving set 28 and to which the antenna transmission line or lead-in is connected.

I have further discovered that from the standpoint of practical and universal application to different reception areas and to obtain the desired circuit resonance, the loop inductances 14, 16 may be provided across their open legs with condensers or capacitors 36 which may be of the fixed type. Better still each loop will be provided with means for adjusting the capacitance and/or inductance to resonate over a band of frequencies. To this end the condensers 36 may be in the form of variable mica trimmer capacitors, 38 (see Figure 8). In actual practice I have found that capacitors of about 10 to about 160 micromicrofarads value are suitable for this purpose. Where such variable capacitors are employed the high-Q loops 26 will be preferably physically cut such that the inductive reactance of each loop is equal to the capacitive reactance of the capacitor 38 at the desired resonant frequency.

Figure 4:
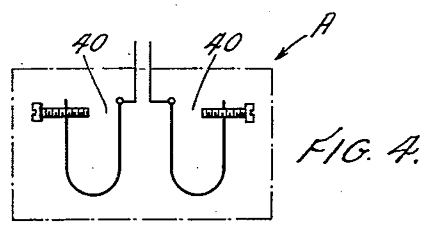
Figures 4 and 5 are schematic views of air di-electric and shorting bar types of adjustable inductance loops which may be employed in the circuiting of Figures 1 to 3 inclusive.
Figure 5:
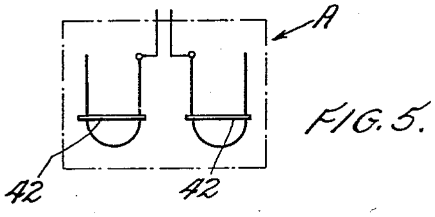

Other forms of adjustment or control of the loop inductance such as a variable air dielectric or gap 40 as in Figure 4 or an adjustable shorting bar 42 on the loop for changing the length of the tuned line, as in Figure 5, may in particular cases be found serviceable in place of a variable capacitor 38.

Figure 2:
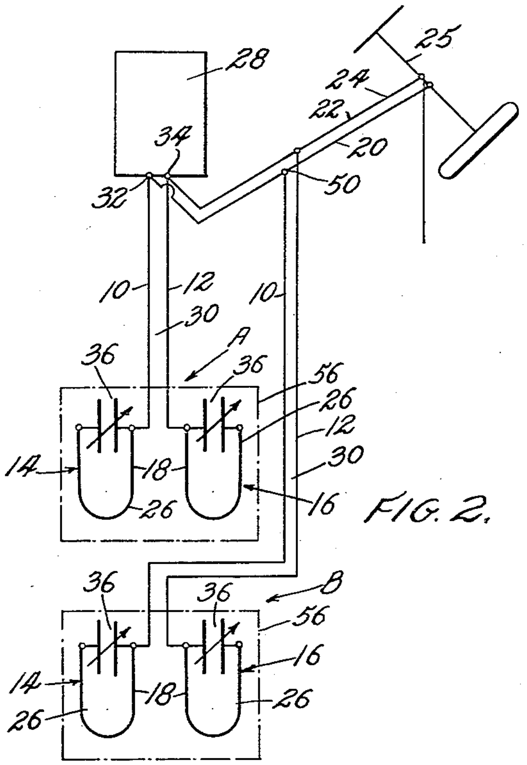
Figure 2 is a schematic view showing another circuiting arrangement utilizing a pair of wave traps of the character illustrated in Figure 1.
Figure 3:
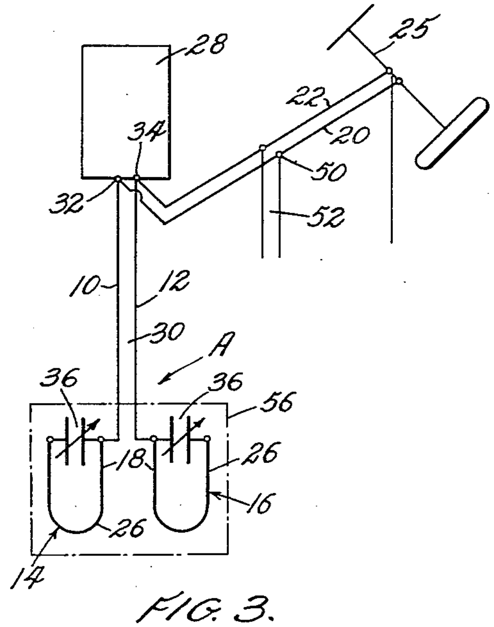
Figure 3 is a schematic view showing a further circuiting arrangement, similar to that in Figure 2 wherein one of the loop type wave traps is replaced by an open circuit lead of predetermined wave length.

I have further discovered that in certain instances of extreme interference a pair of wave traps A and B (see Figure 2) of the foregoing character may be desirably utilized to remove the sound and/or picture waves of the interfering channel. In such instances one of the wave traps A will preferably be connected as described above to the antenna terminals 32, 34 on the set 28 and the other trap B will be connected to the antenna transmission line 24 at a point 50 spaced electrically speaking from such terminals of the transmission line approximately ⅜ of an electrical wave length.

It will also be found possible in certain cases of interference to inhibit the same by utilizing one wave trap A as described above at the antenna terminals 32, 34 and connecting an open lead 52 of approximately one-quarter wave length in parallel with the antenna transmission line 24 at the point 50 a distance of approximately three-eighths of an electrical wave length from the connection of the first wave trap A thereto.

In most instances of installation it will be found desirable, for the sake of good appearance, to provide some form of housing 56 for the loop inductances of the wave trap. In such cases it is preferable that the housing be of a high dielectric material, for example a polystyrene or phenolic type synthetic plastic insulation material as the shielding effect of a metal housing on the loop inductances is deleterious unless a high dielectric air gap is provided between each loop and the housing.

Figure 6:
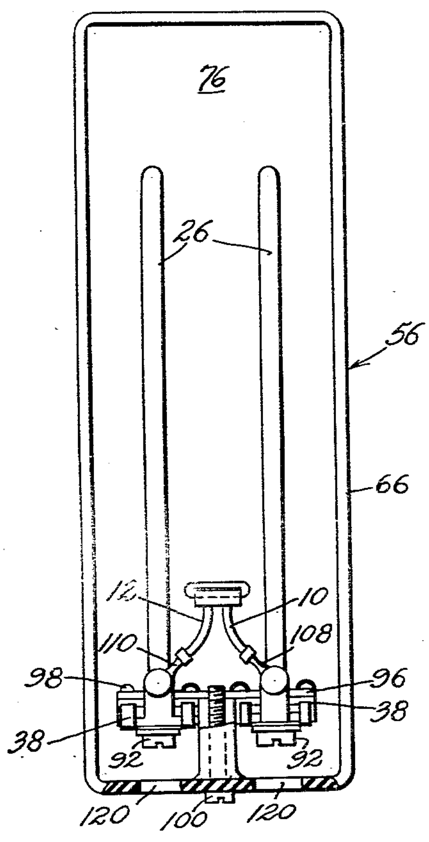
Figure 6 is a front elevational view partly in section of the single loop type of inductance wave trap of Figure 1.
Figure 7:
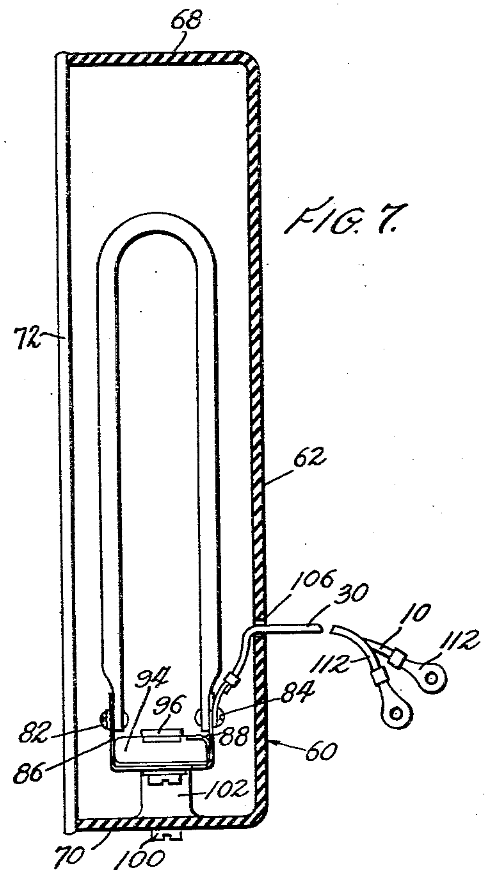
Figure 7 is a side elevational view, partly in section of the wave trap of Figure 6.
Figure 8:
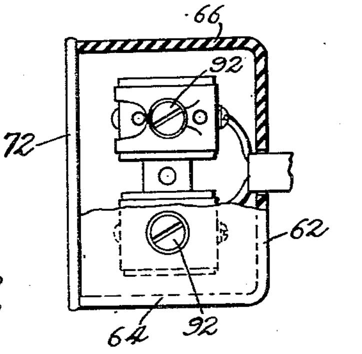
Figure 8 is a bottom view of the wave trap of Figure 6, a portion of the housing for the loop inductance being broken away.

In Figures 6 to 8 I have illustrated a preferred physical form of the high-Q magnetic field coupled, tuned circuits 14, 16 and connectors 10, 12 of my invention. Such conveniently comprises a housing 56 having a dished casing 60 of substantially elongated rectangular form preferably made of a low loss synthetic resin plastic of the aforesaid types and having a back wall 62, side walls 64, 66, and end walls 68, 70. To this casing is secured as by cementing a cover 72 of similar material to the casing.

Arranged interiorly of the housing 56 and spaced from the walls thereof are the pair of symmetrically arranged single loop inductances 26 which are arranged in spaced apart face to face relationship so as to be separated by an air gap 76 and be magnetically coupled. As seen each loop comprises a generally U-shaped metallic rod for example aluminum, shown here as inverted and across the legs 78, 80 of which are secured as by screws 82, 84 the upstanding opposite terminals 86, 88 of conventional plate-type trimmer capacitors or variable condensers 38 preferably of 10 to 160 micromicrofarads capacity, each provided with an adjusting screw 92 for varying the capacity of the condenser between the limits thereof.

The condensers 38 are mounted by their insulated bodies 94 to a metallic cross bar or plate 96 by suitable means such as metallic ears 98 associated with the condenser. The plate 96 is secured as by a screw 100 to a boss 102 of insulation material projecting inwardly from the wall 70 of the housing 56 centrally thereof and which may be an integral part of the casing. It will be observed that the loops 26 are securely supported in a parallel upright manner, with their leg portions parallel to each other and equally spaced from each other, by the condensers 38 which in turn are supported by the plate 96 to the housing.

The rear wall 62 of the housing 56 is provided with an aperture 106 through which is projected the aforesaid section 30 of a two conductor antenna transmission lead wire described above. One of the conductors 10 of this lead connects with one of the loops 26 by a terminal connector 108 held under the screw 84, and the second conductor 12 is similarly connected with the other of the pair of loops 26 by a terminal connector 110. The opposite ends of the conductors 10 and 12 are provided with terminal connectors 112, 114.

In using the unit of Figures 6 to 8 the two terminals 112, 114 of the conductors 10 and 12 respectively of the wave trap are attached for example and by preference to the antenna terminals 32, 34 on the television receiver. The television receiver is then allowed to warm up for at least five minutes. Thereafter and with the housing 58 of the wave trap in hand the screws 92 of the trimmer capacitors 38 are alternately adjusted about one-eighth turn at a time, through the openings 120 of the housing 56 and careful observation is made of any interference while turning either one of the screws 92.

After adjusting for minimum interference the housing 56 is mounted in any suitable manner to the rear of the television receiver, as far as possible from the chassis. The lead 30 should not be coiled but allowed to hang free. After mounting the housing to the set a final adjustment of the wave trap for minimum interference is usually desirable.

Wherever the term "wave length" is used in the specification and claims, it is intended to mean the wave length of the undesired wave and its value may be determined from the electrical wave length of the frequency of the station to be attenuated. Moreover, the term "Q" as used herein is a factor representing the sharpness at resonance of the tuned circuit. The "Q" is high when the sharpness at resonance of the circuit when tuned to the sound carrier of the lower adjacent channel is such that the band width of the resonant curve is sufficiently narrow so that it does not appreciably attenuate the upper channel video carrier. Since the upper channel video carrier is separated from the lower adjacent channel sound carrier by about 1½ megacycles the band width of the curve of the trap at resonance for a high Q condition should preferably not be greater than about one megacycle at the half power point.

From the foregoing description of my invention it will be apparent that I have provided a novel and efficient wave trap for substantially eliminating interference in television receivers especially interference betwen adjacent channels and which wave trap is well adapted for such purposes. It will be understood that various changes and modifications will suggest themselves to those skilled in the art in the specific structure disclosed without departing from the spirit and intent of my invention. Accordingly all such changes, modifications and equivalent structures coming within the scope of the appended claims are contemplated.

I claim:

1. In a television receiving system having a receiving unit, an antenna and a two wire transmission line between the receiving unit and the antenna, means for attenuating interference in reception at the receiving unit comprising a pair of electrically coupled and tunable loop inductances, each of said inductances having two impedance coupled terminals, and each of said inductances being connected to a separate wire of said transmission line at a single point thereon through one of its associated terminals.

2. In a television receiving system having a receiving unit, an antenna and a two wire transmission line between the receiving unit and the antenna, means for attenuating interference in reception at the receiving unit comprising a pair of inductively coupled and tuned inductances, each of said inductances having two terminals and the said two terminals of each inductance being coupled by an impedance, each of said inductances being directly connected to separate wires of said transmission line through only one of its said two terminals and the other terminal of said two terminals of each inductance being connected to the same transmission wire through its associated impedance couple.

3. In a television receiving system having a receiving unit, an antenna and a two wire transmission line between the receiving unit and antenna, means for attenuating interference in reception at the receiving unit comprising a pair of electrically coupled loop inductances and a pair of capacitors coupling the terminal ends of said pair of loop inductances to form a pair of tuned circuits, one capacitor coupling the terminal ends of one loop inductance and the second capacitor coupling the terminal ends of the other loop inductance, one of said two wires of said transmission line being connected to a single one of the terminal ends of said one loop inductance, and the second wire of said transmission line being connected to a single one of the terminal ends of the said other loop inductance, and the other terminal ends of said one and said other loop inductances connecting with said transmission line only by way of said tuned circuits.

4. In a television receiving system having a receiving unit, an antenna and a two wire transmission line between the receiving unit and the antenna, means for attenuating interference in reception at the receiving unit comprising a pair of electrically coupled and tunable loop inductances providing a pair of tuned circuits, each of said inductances having two impedance coupled terminals and a tuned line connecting said inductances with said transmission line, said tuned line comprising two conductors one connecting a single terminal of one of said inductances with one wire of said transmission line and the second conductor connecting a single terminal of the other of said inductances with the second wire of said transmission line, the other terminals of said inductances connecting with said transmission line only through said tuned circuits.

5. In a television receiving system having a receiving unit, an antenna, and a two wire transmission line between the receiving unit and antenna, means for attenuating interference in reception at the receiving unit comprising a pair of inductively coupled inductances each having two terminal ends, separate capacitor means coupling the two said terminal ends of said inductances and adapted to effect resonant tuning of said inductances, and electrical means connecting each of said inductances to a separate wire of said transmission line at a single point thereon through one of its associated terminal ends.

6. In a television receiving system having a receiving unit, an antenna and a two wire transmission line between the receiving unit and the antenna, means for attenuating interference in reception at the receiving unit comprising a pair of electrically coupled and tuned inductances each providing a tuned circuit, each inductance comprising a U loop inductance having a capacitance coupling its opposite legs, means connecting one wire of said transmission line with a single leg of one of said U loops, and means connecting the second wire of said transmission line with a single leg of the other of said U loops, the other legs of said U loops connecting with said transmission line only through said tuned circuits.

7. An interference attenuating means as claimed in claim 6 wherein the capacitance coupling the legs of the U loop inductances are variable condensers and wherein the corresponding legs of said loops are in face-to-face relationship.

8. An interference wave trap for a television receiving means having a receiving unit, an antenna, and a two wire transmission line between the receiving unit and antenna said trap comprising a pair of loop inductances arranged in juxtaposed and electrically coupled relationship, a first electrical terminal means connecting with a single leg of one of said loop inductances, a second electrical terminal means connecting with a single leg of the other of said loop inductances, and means for effecting tuning of said trap comprising a first capacitance coupling the legs of one of said pair of loop inductances, and a second capacitance coupling the legs of the other of said pair of loop inductances, each of said inductances being adapted to be connected to a separate wire of said transmission line at a single point thereon through its associated electrical terminal means.

9. In a television receiving system having a receiving unit, an antenna and a two wire transmission line between the receiving unit and the antenna, means for attenuating interference in reception at the receiving unit comprising a pair of electrically coupled and tunable inductances each inductance comprising a substantially U loop inductance having shorting bar means coupling its legs and forming therewith a tuned circuit and means connecting each wire of said transmission line with a single leg of a different one of said two loop inductances, the other legs of said loop inductances connecting with said transmission line only through said tuned circuits.

10. The combination as set forth in claim 1 including a second pair of tunable loop inductances similarly connected to said transmission line at a position thereon a predetermined wave length from the first mentioned pair of said loop inductances.

11. A wave trap for attenuating interference in television receivers comprising a housing of high dielectric material having surrounding walls, a plate mounted in one end of said housing adjacent a wall at that end, a pair of variable capacitors mounted in spaced relation on said plate and having their opposite terminals transversely of said plate, a pair of substantially U-shaped loop inductances of bar material carried by said plate and in spaced relation to the walls of said housing, one of said inductances having its legs connected to the said opposite terminals respectively of one of said capacitors and the other inductance being similarly connected to the other capacitor, said loop inductances as so connected having their corresponding legs face-to-face to each other and at such spacing as to establish an inductively coupled relationship therebetween, a conductor connecting with a single terminal of one of said capacitors and a second conductor connecting with a single terminal of the other of said capacitors, each of said loop inductances being adapted to be connected to a separate wire of a two wire transmission line at a single point thereon through its said associated conductor.

References Cited in the file of this patent

UNITED STATES PATENTS

| | | |
|---|---|---|
| 2,031,103 | George | Feb. 18, 1936 |
| 2,051,520 | Evans | Aug. 18, 1936 |
| 2,109,465 | Carter | Mar. 1, 1938 |
| 2,109,536 | Kautter | Mar. 1, 1938 |
| 2,196,272 | Peterson | Apr. 9, 1940 |
| 2,238,438 | Alford | Apr. 15, 1941 |
| 2,248,751 | Frankel | July 8, 1941 |

OTHER REFERENCES

"Electronics," October 1945, pages 150 and 152.